INVENTORS
J. V. ARMENANTE
F. A. RUSSO
ATTORNEY

June 3, 1958    J. V. ARMENANTE ET AL    2,837,133
TRACTION OR ANTI-SKID DEVICE FOR MOTOR VEHICLES
Filed Aug. 1, 1956    5 Sheets-Sheet 3

INVENTORS
J. V. AMENANTE
F. A. RUSSO
by [signature]
ATTORNEY

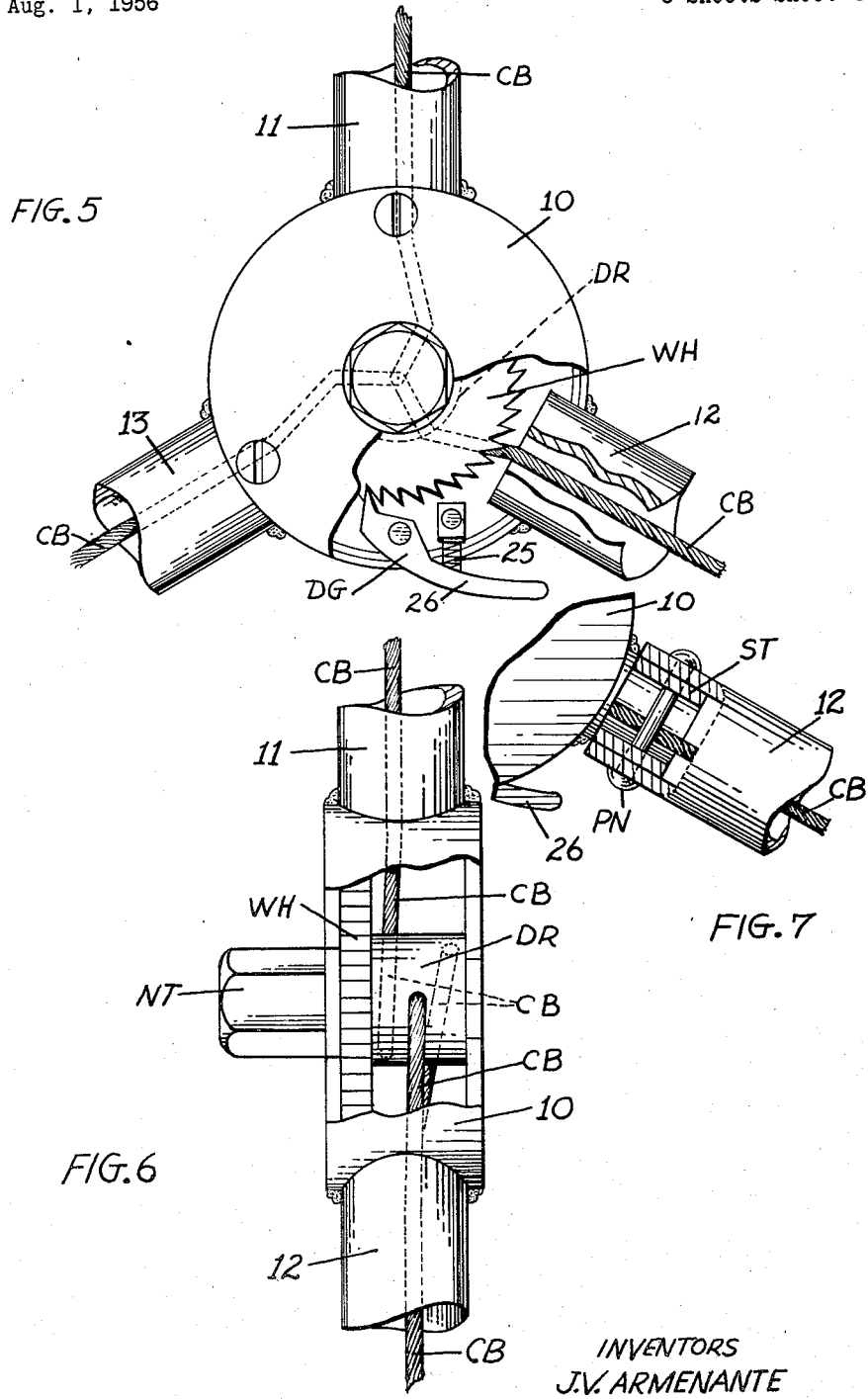

June 3, 1958 J. V. ARMENANTE ET AL 2,837,133
TRACTION OR ANTI-SKID DEVICE FOR MOTOR VEHICLES
Filed Aug. 1, 1956 5 Sheets-Sheet 5

INVENTORS
J. V. ARMENANTE
F. A. RUSSO
BY
ATTORNEY

United States Patent Office 2,837,133
Patented June 3, 1958

2,837,133

TRACTION OR ANTI-SKID DEVICE FOR MOTOR VEHICLES

Jerry V. Armenante and Frank A. Russo, Newark, N. J.

Application August 1, 1956, Serial No. 601,524

12 Claims. (Cl. 152—218)

This invention relates to traction or antiskid devices for the wheels of motor vehicles and, more particularly, to a device which may be readily applied and removed from the wheels of a motor vehicle with a minimum amount of time and effort.

An object of our invention is the provision of a device which may be readily applied to and removed from the wheel of a motor vehicle without the inconvenience and troubles usually associated with the application of tire chains or emergency chains.

Another object of our invention is the provision of a traction or antiskid device which comprises a self-contained unitary structure which adapts itself to various sizes of tires.

A further object of the invention is the provision of a traction or antiskid device which will provide a maximum amount of traction for the wheel to which it is applied with a minimum amount of wear on the tire.

A still further object of the invention is the provision of an antiskid or traction device which is compact in form and may be readily stored in the vehicle.

A still further object of the invention is the provision of an antiskid or traction device which is so constructed that the wearing qualities of the road-gripping components are considerably better than devices now in common use.

A still further object of our invention is the provision of a device which will eliminate the need for tire chains and the attendant nuisance associated therewith by providing a simple, compact, foolproof, readily applied device which will provide a greater amount of traction than is possible with the present and well known devices.

Present day practices for the reduction and elimination of accidents due to skidding on wet and icy pavements and the increasing of the traction of the wheels of motor vehicles under adverse conditions such as ice, snow, mud, and so forth, call for the application of tire chains to the tire. These chains may be of the complete encircling type or they may be of the so-called emergency type. In any event, they are a type of chain which is not only a nuisance to apply and remove but they wear out readily. Hence many individuals are reluctant to use chains since the attendant nuisance associated therewith does not seem to justify the advantages to be gained by the use thereof.

It is realized that this is a false concept but, human nature being what it is, the use of present day tire chains is avoided by the general public as much as possible and this lack of use not only delays and holds up traffic but is a major factor in the causing of accidents.

The applicants, being cognizant of the public's attitude with regard to tire chains, have devised an antiskid and traction device for the wheels of motor vehicles which may be readily applied and removed.

The device of their invention contemplates the use of suitable road-gripping members or cleats spaced equidistant around the periphery of the tire, supported and suitably secured to arms which radiate from a central hub member which is in alignment with the axis of the wheel. Means are provided on the central hub member for locking the assembly firmly in position with the cleats gripping the outer surface of the tire so that a minimum amount of movement occurs therebetween.

The invention will be more clearly understood from the following detailed description when read in connection with the following drawings, of which:

Fig. 5 is a fragmentary plan view, partly in section, with parts broken away disclosing the central supporting hub and the ratchet mechanism associated therewith for withdrawing and locking the extending arms and their associated gripping members or cleats;

Fig. 6 is a fragmentary side view of the structure shown in Fig. 5 with parts broken away;

Fig. 7 is a modified method of securing the radiating arms to the central hub member so that they may be folded back thereagainst for compact storage;

In the preferred embodiment of our invention, as shown in the various figures heretofore referred to, the numeral 10 represents a central housing or hub having radiating therefrom and spaced equidistant apart a plurality of arms 11, 12, and 13. These arms, as shown, are secured to the hub 10, are in the same plane, and are substantially tubular in cross section.

Figure 4:
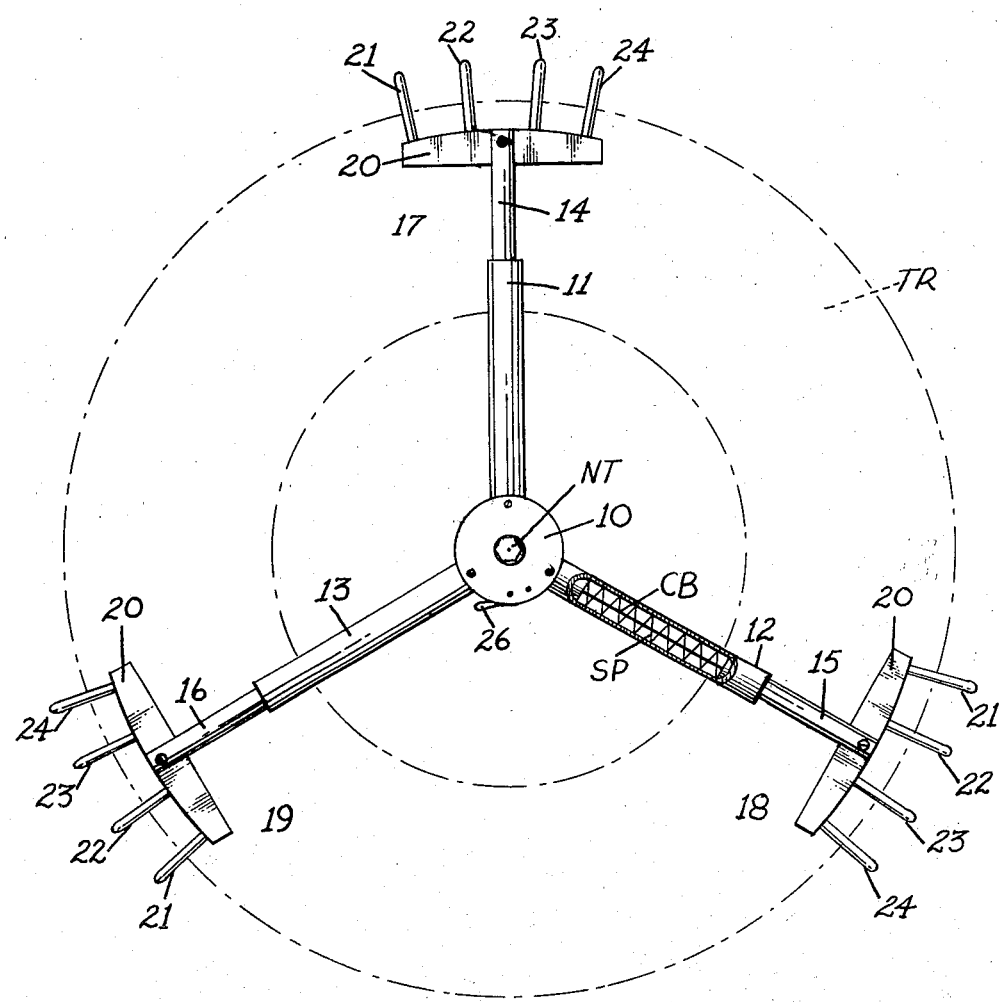
Fig. 4 is a view similar to Fig. 3 but with the gripping members extended under the influence of the coil springs.

Slidably mounted in the tubular radiating arms 11, 12, 13 are the extending rods 14, 15, and 16. These rods have a sliding fit within the arms 11, 12, and 13 and are forced outwardly by means of the coiled springs SP, as shown in Fig. 4.

Secured to the free ends of the rods 14, 15, 16 are the cleats or road-gripping members 17, 18, 19, which may be of any desired configuration that will provide good traction. For the purpose of illustration, there is disclosed in Figs. 1 to 4, inclusive, a type of cleat which the applicants have found to be satisfactory for the purpose intended. This cleat, as shown, comprises a base member 20 which is secured to the ends of rods 14, 15, 16 in any suitable manner, as heretofore described. Positioned on the base member 20 and extending therefrom are a plurality of fingers or bars 21, 22, 23, and 24. These bars extend across the tread of the tire TR, around a portion thereof, and are in firm contact therewith, as shown in the various figures.

Figure 1:
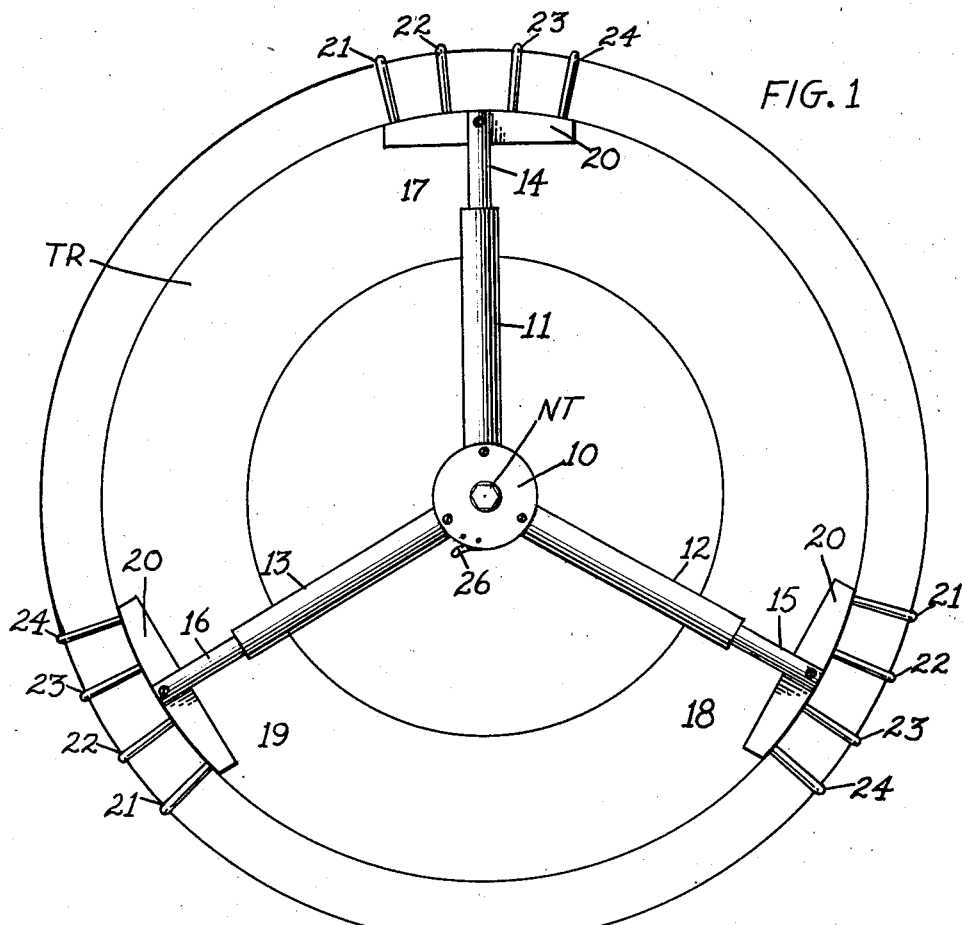
Fig. 1 is a front elevational view of the wheel of a motor vehicle with the device of this invention in position on the tire.
Figure 2:
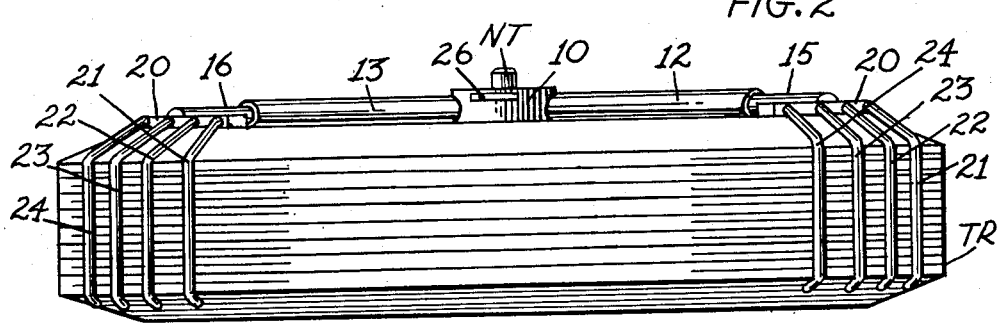
Fig. 2 is a plan view of the structure shown in Fig. 1 and discloses the road-gripping members or cleats in juxtaposition with respect to the tread of the tire.
Figure 3:
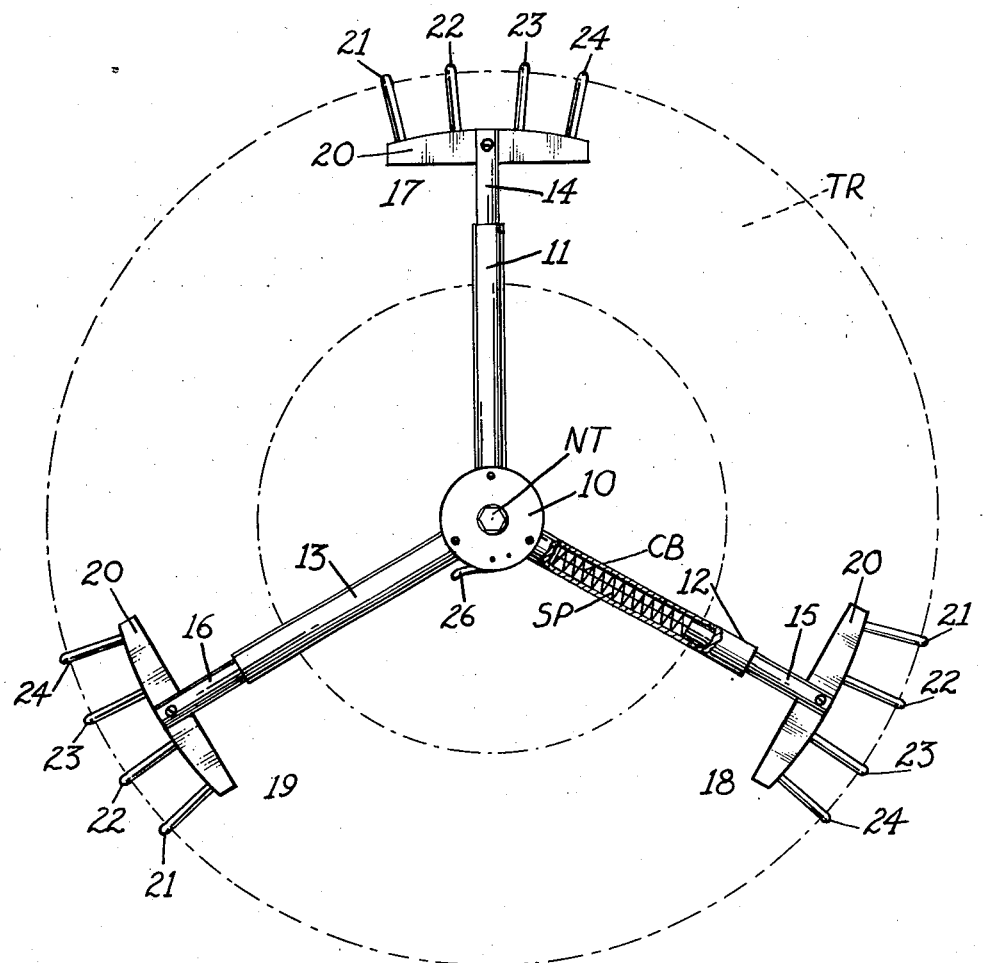
Fig. 3 is a view of the device of our invention removed from the tire with the road-gripping members contracted against the tension of a coil spring as shown in the section broken away.
Figure 11:
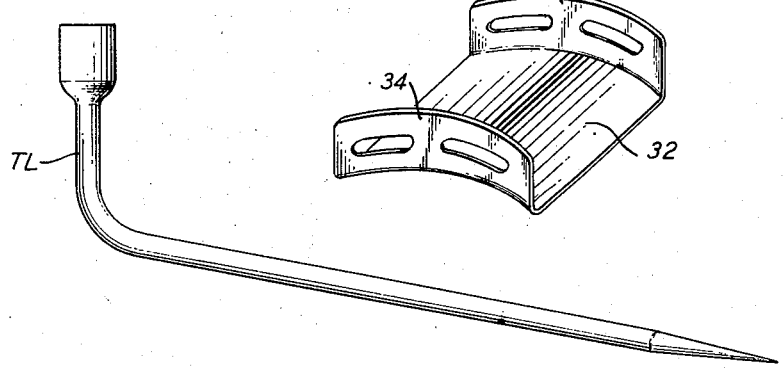
Fig. 11 shows a suitable tool for the application to and removal from a wheel of the device of our invention.
Figure 12:
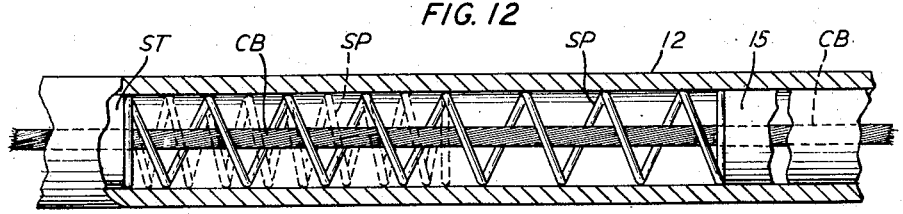
Fig. 12 is an enlarged fragmentary view partly in section of the arm 12 shown in Fig. 4.

As shown in the drawings and more in detail in Figs. 5 and 6, cables CB, preferably made of a strong flexible material, are positioned in the bores of the tubular arms 11, 12, and 13 with their outer ends secured to the inner ends of the rods 14, 15, 16, as shown in Figs. 2 and 3. The inner ends of the cables CB are secured to a drum member DR which is mounted on a suitable spindle which is journaled in the housing 10, as shown in detail in Fig. 6. The spindle has secured integrally therewith a ratchet wheel WH, which is adapted to be rotated clockwise by means of a tool TL, such as is shown in Fig. 11, applied to the nut NT which is an integral part of the assembly of the drum, ratchet, and spindle. It will be, therefore, readily observed that when the ratchet wheel WH is rotated clockwise by means of the tool TL engaging the nut NT, the cables CB will be wound around the drum DR, thereby tensioning the cables and causing the rods 14, 15 and 16 to be withdrawn against the tension of the springs SP and be locked in position by means of the dog DG engaging the teeth of the ratchet wheel WH. A suitable spring 25, as shown, maintains the dog DG in position against the teeth of the ratchet wheel WH to prevent disengagement thereof and the consequent accidental rotation thereof.

When it is desired to extend the arms 11, 12, 13 for the removal of the assembly from the tread of the tire TR secured to the wheel WH, the dog DG is released by depressing the free end 26, thereby permitting the ratchet wheel WH to rotate counterclockwise and allow the springs SP to force the arms 11, 12, 13 and their associated cleats outwardly and out of contact with the tread of the tire TR, thereby permitting the assembly to be readily removed therefrom.

In applying the device of our invention to a tire, it is only necessary to reverse this procedure, for example, to rotate the nut clockwise until the cleats 10 firmly grip the tire tread TR.

In Fig. 7 we have shown a modified structure wherein the tubular radiating arms 11, 12, and 13 may be hingedly secured to the hub 10 by providing extending studs ST which are secured to the hub 10 and have the radiating arms rotatably secured thereto by means of the pins PN. This structure will permit the arms to be folded over the hub to provide a compact structure which will occupy a minimum amount of storage space.

Figure 8:
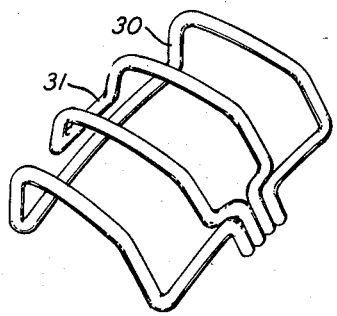
Fig. 8 is a view in perspective illustrating one form of road-gripping member or cleat.

The modified cleat shown in Fig. 8 comprises essentially a plurality of looped members 30 and 31, joined together at their free ends and so shaped that they conform to the tread of the tire TR.

Figure 9:
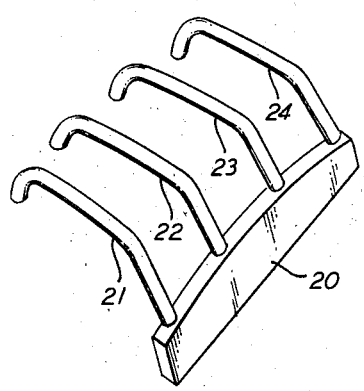
Fig. 9 is a modified form of road-gripping member or cleat which comprises a plurality of transversely positioned fingers or arms.

The cleat of Fig. 9 is an enlarged view of the structure shown in the figures heretofore referred to and comprises a base 20, and extending fingers 21, 22, 23, and 24 secured thereto and so shaped as to provided suitable road-gripping surfaces.

Figure 10:
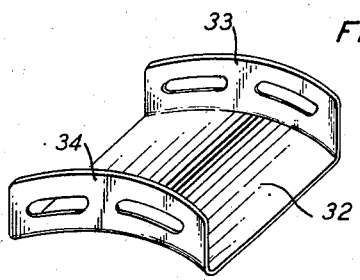
Fig. 10 is a modified form of road-gripping cleat particularly adapted for use in mud.

The modified cleat shown in Fig. 10 comprises a flat arcuate plate 32 with upstanding gripping edges 33 and 34. This cleat may be substituted for the cleats heretofore described when it is desired to use the device of this invention for mud or other materials of a similar nature.

While we have shown and described the preferred embodiment of our invention, it is to be understood that various changes and modifications may be made therein without departing from the spirit of the invention and we only intend to be limited by the scope of the claims appended hereto.

What is claimed is:

1. A traction device intended for application to the tires on the wheels of motor vehicles comprising in combination a tire, a wheel for mounting said tire, a hub member centrally disposed with respect to the axis of said tire and said wheel, a plurality of arms rigidly secured to and radiating from said hub member and having extendable portions mounted thereon, removable gripping means mounted on the free ends of said extendable members and adapted to embrace the tread of said tire, ratchet means on said hub member for retracting and locking said extendable members, whereby said gripping means are held in intimate contact with the tread of said tire.

2. A traction device intended for application to the tires on the wheels of motor vehicles comprising in combination a tire, a wheel for mounting said tire, a hub member centrally disposed with respect to the axis of said tire and said wheel, a plurality of tubular arms rigidly secured to and radiating from said hub member and having extendable portions mounted therein, removable gripping means mounted on the free ends of said extendable members and adapted to embrace the tread of said tire, ratchet means on said hub member for retracting and locking said extendable members, whereby said gripping means are held in intimate contact with the tread of said tire.

3. A traction device intended for application to the tires on the wheels of motor vehicles comprising in combination a tire, a wheel for mounting said tire, a hub member centrally disposed with respect to the axis of said tire and said wheel, a plurality of arms rigidly secured to and radiating from said hub member and having extendable portions mounted in telescope relation therewith, removable gripping means mounted on the free ends of said extendable members and adapted to embrace the tread of said tire, ratchet means on said hub member for retracting and locking said extendable members, whereby said gripping means are held in intimate contact with the tread of said tire.

4. A traction device intended for application to the tires on the wheels of motor vehicles comprising in combination a tire, a wheel for mounting said tire, a hub member centrally disposed with respect to the axis of said tire and said wheel, a plurality of tubular arms rigidly secured to and radiating from said hub member and having extendable portions mounted in telescope relation therewith, removable gripping means mounted on the free ends of said extendable members and adapted to embrace the tread of said tire, ratchet means on said hub member for retracting and locking said extendable members, whereby said gripping means are held in intimate contact with the tread of said tire.

5. A traction device intended for application to the tires on the wheels of motor vehicles comprising in combination a tire, a wheel for mounting said tire, a hub member centrally disposed with respect to the axis of said tire and said wheel, a plurality of arms rigidly secured to and radiating from said hub member and having extendable portions including a plurality of removable transversely extending fingers mounted thereon and adapted to embrace the tread of said tire, ratchet means on said hub member for retracting and locking said extendable members, whereby said fingers are held in intimate contact with the tread of said tire.

6. A traction device intended for application to the tires on the wheels of motor vehicles comprising in combination a tire, a wheel for mounting said tire, a hub member centrally disposed with respect to the axis of said tire and said wheel, a plurality of tubular arms rigidly secured to and radiating from said hub member and having extendable portions including a plurality of detachable transversely extending fingers mounted thereon and adapted to embrace the tread of said tire, ratchet means on said hub member for retracting and locking said extendable members, whereby said fingers are held in initimate contact with the tread of said tire.

7. A traction device intended for application to the tires on the wheels of motor vehicles comprising in combination a tire, a wheel for mounting said tire, a hub member centrally disposed with respect to the axis of said tire and said wheel, a plurality of arms rigidly secured to and radiating from said hub member and having extendable portions mounted in telescope relation therewith, detachable gripping means comprising a plurality of transversely extending fingers mounted on the free ends of said extendable members and adapted to embrace the tread of said tire, ratchet means on said hub member for retracting and locking said extendable members, whereby said gripping means are held in intimate contact with the tread of said tire.

8. A traction device intended for application to the tires on the wheels of motor vehicles comprising in combination a tire, a wheel for mounting said tire, a hub member centrally disposed with respect to the axis of said tire and said wheel, a plurality of tubular arms rigidly secured to and radiating from said hub member and having extendable portions including a plurality of detachable transversely extending fingers mounted in telescope relation therefrom, said gripping fingers mounted on the free ends of said extendable members and adapted to embrace the tread of said tire, ratchet means on said hub member for retracting and locking said extendable members, whereby said gripping means are held in intimate contact with the tread of said tire.

9. A traction device intended for application to the tires on the wheels of motor vehicles comprising in combination a tire, a wheel for mounting said tire, a hub member centrally disposed with respect to the axis of said tire and said wheel, a plurality of arms rigidly secured to and radiating from said hub member and having extendable portions mounted thereon, detachable gripping means mounted on the free ends of said extendable members and adapted to embrace the tread of said tire, ratchet means on said hub member and flexible members associated therewith and connected to said extendable members for retracting and locking said extendable members, whereby said gripping means are held in intimate contact with the tread of said tire.

10. A traction device intended for application to the tires on the wheels of motor vehicles comprising in combination a tire, a wheel for mounting said tire, a hub member centrally disposed with respect to the axis of said tire and said wheel, a plurality of tubular arms rigidly secured to and radiating from said hub member and having extendable portions mounted therein, detachable gripping means mounted on the free ends of said extendable members and adapted to embrace the tread of said tire, ratchet means on said hub member and flexible members associated therewith and connected to said extendable members for retracting and locking said extendable members, whereby said gripping means are held in intimate contact with the tread of said tire.

11. A traction device intended for application to the tires on the wheels of motor vehicles comprising in combination a tire, a wheel for mounting said tire, a hub member centrally disposed with respect to the axis of said tire and said wheel, a plurality of arms rigidly secured to and radiating from said hub member and having spring biased extendable portions mounted in telescope relation therewith, detachable gripping means mounted on the free ends of said extendable members and adapted to embrace the tread of said tire, ratchet means on said hub member and flexible members associated therewith and connected to said extendable members for retracting and locking said extendable members, whereby said gripping means are held in intimate contact with the tread of said tire.

12. A traction device intended for application to the tires on the wheels of motor vehicles comprising in combination a tire, a wheel for mounting said tire, a hub member centrally disposed with respect to the axis of said tire and said wheel, a plurality of tubular arms rigidly secured to and radiating from said hub member and having spring biased extendable portions mounted in telescope relation therewith, detachable gripping means mounted on the free ends of said extendable members and adapted to embrace the tread of said tire, ratchet means on said hub member and flexible members associated therewith and connected to said extendable members for retracting and locking said extendable members, whereby said gripping means are held in intimate contact with the tread of said tire.

References Cited in the file of this patent

UNITED STATES PATENTS

| | | |
|---|---|---|
| 2,423,759 | Edwards | July 8, 1947 |
| 2,517,634 | Daley | Aug. 8, 1950 |
| 2,598,298 | Pindjak | May 27, 1952 |
| 2,767,761 | O'Higgins | Oct. 23, 1956 |